United States Patent [19]

Wakabayashi

[11] 3,926,493
[45] Dec. 16, 1975

[54] CONNECTING DEVICE
[75] Inventor: Hiroshi Wakabayashi, Yokohama, Japan
[73] Assignee: Nippon Kogaku K.K., Tokyo, Japan
[22] Filed: Nov. 26, 1974
[21] Appl. No.: 527,418

[30] Foreign Application Priority Data
Dec. 4, 1973 Japan .................. 48-138313[U]

[52] U.S. Cl. ............................................. 339/12 R
[51] Int. Cl.² .................................... H01R 11/30
[58] Field of Search .................... 339/12 R, 12 G

[56] References Cited
UNITED STATES PATENTS
3,363,214  1/1968  Wright ........................... 339/12 R
3,868,160  2/1975  Kersman ....................... 339/12 R

*Primary Examiner*—Roy Lake
*Assistant Examiner*—DeWalden W. Jones
*Attorney, Agent, or Firm*—Fitzpatrick, Cella, Harper & Scinto

[57] ABSTRACT

A connecting device using a magnet to accomplish a connection comprises an insert member and a receptor member. The device further includes a restraining lever pivotally supported at one end by the insert member and having an inserting portion. The insert member has an engaging portion provided so as to face the restraining portion of the restraining lever upon insertion of the insert member into the receptor member. A magnetic member is provided on one of the restraining lever or the receptor member. A magnet is provided on the other of the restraining lever or the receptor member. The magnet is adapted to face the magnetic member upon insertion of the insert member into the receptor member, and is capable of attracting the magnetic member to pivot the restraining lever to bring the restraining portion of the restraining lever into engagement with the engaging portion of the receptor member thus retaining the connection between the insert and receptor members. A member is provided for pivoting the restraining lever to release the engagement between the restraining portion of the insert member and the engaging portion of the receptor member.

10 Claims, 4 Drawing Figures

CONNECTING DEVICE

BACKGROUND OF THE INVENTION

1. Field of the Invention

This invention relates to a connecting device, and more particularly to a connecting device which utilizes a magnet to retain the connection of the connector.

2. Description of the Prior Art

Known connecting devices have been provided with members for accomplishing and completing an intended connection, and for retaining the connection against inadvertent disconnection. In such connecting devices it is desirable that the means for assuring retention of the connection be automatically activated simultaneously with the completion of the connection. For this reason, an insert member forming one unit of the connecting device has been provided with a resilient restraining member, and a receptor member forming the other unit of the connecting device has been provided with an engaging member engageable with the restraining member, whereby the resilient member has been displaced due to its resilient deformation during connection between the insert member and the receptor member and the resilient member has been released from its resilient deformation upon completion of the connection between the two members so that the displacement of the resilient member thus induced has brought the restraining member into engagement with the engaging member, thereby retaining the connected condition.

However, such known connecting devices using resilient members have been disadvantageous in that they are largesized.

SUMMARY OF THE INVENTION

I have conceived and contribute by the present invention a small connecting device which will positively retain the connected condition even where it is difficult to use a resilient member as the restraining member.

In accordance with a preferred embodiment of the present invention, I provide a connecting device using a magnet to accomplish a connection which comprises, an insert member, restraining means which may take the form of a lever having a restraining portion and pivotally supported at one end on the insert member, a receptor member, an engaging portion of the receptor member provided so as to face the restraining portion of the restraining lever upon insertion of the insert member into the receptor member, a magnetic member provided on one of the restraining lever of the insert member or the receptor member, a magnet provided on the other of the restraining lever of the insert member or the receptor member and adapted to face the magnetic member upon insertion of the insert member into the receptor member, the magnet being capable of attracting the magnetic member to pivot the restraining lever thereby to bring the restraining portion of the restraining lever into engagement with the engaging portion of the receptor member and retaining the connection between the insert member and the receptor member, and a member for pivoting the restraining lever to release the engagement between the restraining portion of the restraining lever of the insert member and the engaging portion of the receptor member.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
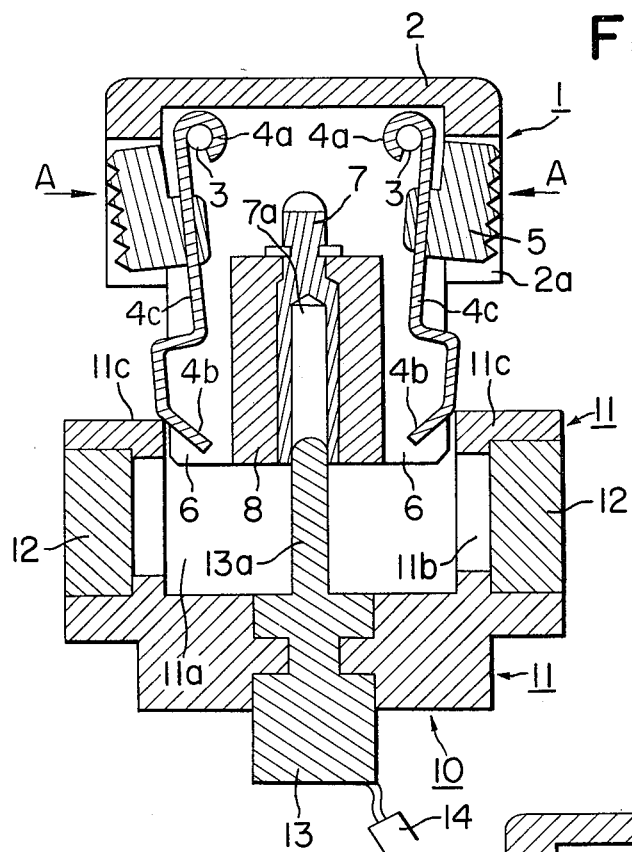
FIG. 1 is a cross-sectional view of a connector according to a first embodiment of the present invention and showing the connector in a position at which the connection begins to occur.
Figure 2:
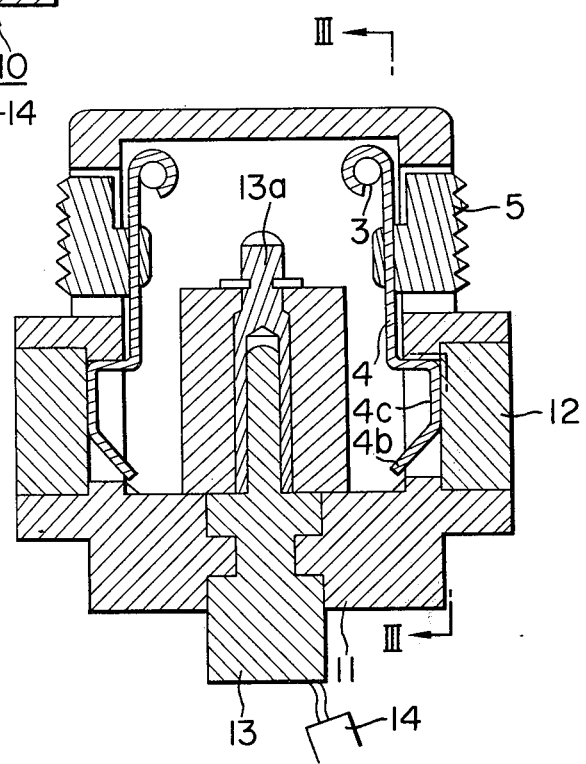
FIG. 2 is a view similar to FIG. 1 but showing the connector in a position at which the connection has been completed.
Figure 3:
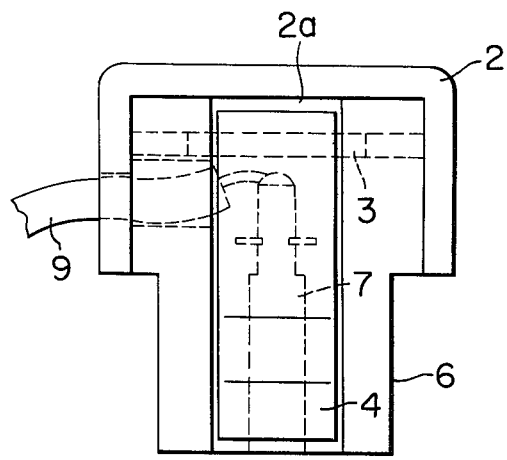
FIG. 3 is a cross-sectional view taken along line III—III of FIG. 2.

Referring to the drawings, FIG. 1 is a view of a connector according to a first embodiment of the present invention and illustrates the position in which the connecting operation begins to occur. FIG. 2 is a similar view but illustrates the position in which the connecting operation has been completed, and FIG. 3 is a cross-sectional view taken along line III—III of FIG. 2. In these FIGS., a socket insert 1, forming the insert portion of the connector, comprises an outer shell 2, two pins 3, two restraining levers 4, two restraint releasing members 5, two holding plates 6 (see FIG. 3), an electrical conductor 7, a support member 8 for the conductor, and a lead wire 9 (see FIG. 3) connected to the conductor 7. The pins 3 are supported between the two holding plates 6 which are securely fixed to the outer shell 2 in a known manner, not shown. The restraining levers 4 are formed of ferromagnetic material and are each pivotally supported at one end 4a on the pins 3. The restraint releasing members 5 are located within two cut-away portions 2a, respectively, in the outer shell 2 so as to be operable from outside, and they each have one end secured to the restraining levers 4. Each of the restraining levers 4 has a sloped portion 4b and a restraining portion 4c at one end. The support member 8 is securely fixed to the holding members 6 and supports the electrical conductor 7 which is formed with a longitudinal bore 7a extending upwardly from its lower end, as viewed, and which is of course insulated from its surroundings.

Description will now be made of a pin insert 10 which forms the receptor portion of the connector.

The pin insert 10 comprises a main body 11, two permanent magnets 12, an electrical conductor 13 and a lead wire 14. The main body 11 securely supports the permanent magnets 12 and has a clearance 11a for receiving therein the socket insert 1, and a cut-away portion 11b extending between the permanent magnets 12 and the clearance 11a. The conductor 13 is secured to the main body 11 and has at one end thereof an elongate tip end portion 13a adapted to be inserted into the hollow portion 7a of the electrical conductor of the socket insert 1.

Operation of such connector will now be described.

As seen in FIG. 1, when an attempt is made to insert the socket insert 1 into the pin insert 10, the sloped portions 4b of the restraining levers 4 engage the end portion 11c of the main body of the pin insert 10, and the movement of insertion causes inward pivoting of the restraining levers 4 about the pins 3, respectively. When the insertion is continued until the restraining portions 4c of the restraining levers 4 are opposite the cut-away portions 11b in the main body 11, the restraining levers 4 are attracted by the permanent magnets 12 to cause the levers 4 to pivot outwardly about the pins 3 thereby to permit the restraining portions 4c to be received in the cut-away portions 11b, as shown in FIG. 2 in which the connector has completed its connection. When this occurs, the tip end portion 13a is of course positioned in the bore 7a to establish an electrical connection between the conductor 13 and the conductor 7.

With such connection of the connector completed, any extraneous force imparted thereto could not cause disengagement between the socket insert 1 and the pin insert 10 of the connector because of the secure engagement between the restraining portions 4c and the main body 11, by reason of their positions in the cut-away portions 11b.

To remove the socket insert 1 from the pin insert 10, the restraint releasing members 5 may be extraneously pushed in the direction of arrows A, to pivot the restraining levers 4 against the attraction of the magnets 12 to disengage the restraining portions 4c from the cut-away portions 11b, whereafter, the socket insert 1 may be manually withdrawn from the pin insert 10.

Figure 4:
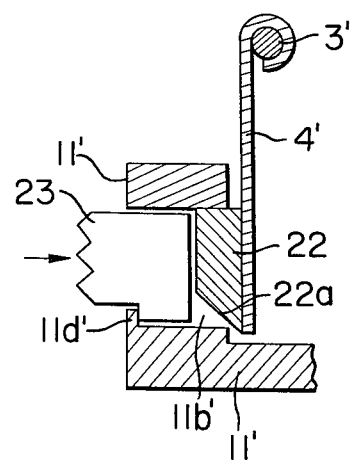
FIG. 4 is a cross-sectional view of the connector according to a second embodiment of the present invention.

FIG. 4 illustrates a second embodiment of the present invention wherein functionally similar parts are given reference characters similar to those in the first embodiment, and structurally different parts alone are shown.

A permanent magnet 22 is securely fixed to a restraining lever 4', and has a sloped portion 22a which is functionally similar to the sloped portion 4b of the restraining lever in the first embodiment.

The second embodiment lacks the restraint releasing member 5 as shown in the first embodiment, and instead has in the main body 11' of the pin insert, a restraint releasing member 23 of ferromagnetic material slidable in the direction of arrow B. The main body 11' has a projection 11d' which provides a stop for limiting the sliding movement of the restraint releasing member 23 in a direction opposite to that of arrow B. The restraint releasing member 23 is normally biased by unshown biasing member in the direction opposite to that indicated by arrow B. In other respects, the second embodiment is structurally identical with the first embodiment. With such construction, complete insertion of the socket insert into the pin insert permits the magnet 22 to be attracted by the restraint releasing member 23 of the ferromagnetic material, which in turn displaces the restraining lever 4' to the shown position, thus completing the restraint.

To release the restraint, an extraneous force may be imparted to the restraint releasing member 23 to slide it in the direction of arrow B against the force of the unshown biasing member, to move the magnet 22 from the cut-away portion 11b'.

In the first embodiment, the restraining members are formed of magnetic material and the magnets are provided in the receptor portion; and in the second embodiment, the magnetic members are provided in the receptor portion and the magnets are provided on the restraining levers, but the magnetic members attracted by the magnets may be magnets of the opposite polarity to that of the first mentioned magnets.

It will thus be apparent that the connecting device of the present invention utilizes the magnetic forces of the magnets to displace the restraining levers to accomplish the restraint of the connectiing device, and this permits construction of the device of a very small size and great simplicity and reliability. Such device will particularly be effective where the available space is not sufficient to permit conventional resilient members to be used as the restraining levers.

I believe that the construction and operation of my novel connecting device will now be understood and that the advantages thereof will be fully appreciated by those persons skilled in the art.

I claim:

1. A connecting device using a magnet to accomplish a connection, comprising:
   an insert member;
   restraining means having a restraining portion and pivotally supported at one end on said insert member;
   receptor means;
   an engaging portion formed on said receptor means to face said restraining portion of said restraining means upon insertion of said insert member into said receptor means;
   a magnetic member provided on one of said means;
   a magnet provided on the other of said means and adapted to face said magnetic member upon insertion of said insert member into said receptor means, said magnet being capable of attracting said magnetic member to pivot said restraining means to bring the restraining portion of said restraining means into engagement with the engaging portion of said receptor means and retaining the connection between said insert member and said receptor means; and
   a member for pivoting said restraining means to release the engagement between the restraining portion of said restraining means and the engaging portion of said receptor means.

2. A connecting device according to claim 1, wherein said restraining means comprises at least one lever.

3. A connecting device according to claim 1, wherein said magnetic member is provided on said restraining means and said magnet is provided on said engaging portion of said receptor member.

4. A connecting device according to claim 1, wherein said magnetic member is provided on said engaging portion of said receptor member and said magnet is provided on said restraining means.

5. A connecting device according to claim 3, wherein said restraining means itself is a magnetic member.

6. A connecting device according to claim 2, wherein said restraining lever has a convex portion, and said engaging portion has a concave portion engageable with said convex portion of said restraining lever.

7. A connecting device according to claim 6, wherein said restraining lever further has a sloped portion adapted to contact said receptor member, and said sloped portion pivots said restraining lever during insertion of said insert member into said receptor member, whereby said restraining lever is readily insertable into said receptor member.

8. A connecting device according to claim 6, wherein said restraining lever is a magnetic member and said magnet is provided on the engaging portion of said receptor member.

9. A connecting device according to claim 1, further comprising:

a first electrical conductor provided in said insert member;

an insulative support member provided in said insert member for providing insulation between said insert member and said first electrical conductor; and a second electrical conductor provided in said insert member and adapted to contact said first electrical conductor upon insertion of said insert member into said receptor member;

said receptor member being an insulator.

10. A connecting device according to claim 1, wherein said restraining means comprises a plurality of levers.

* * * * *

UNITED STATES PATENT OFFICE
CERTIFICATE OF CORRECTION

Patent No. 3,926,493  Dated December 16, 1975

Inventor(s) HIROSHI WAKABAYASHI

It is certified that error appears in the above-identified patent and that said Letters Patent are hereby corrected as shown below:

Column 2, line 57, change "a restraining" to -- a convex restraining --.
Column 3, line 1, change "cut-away por-" to -- cut-away or concave por- --.
Column 4, line 17, change "connectiing" to -- connecting --.

Signed and Sealed this eighteenth Day of May 1976

[SEAL]

Attest:

RUTH C. MASON
Attesting Officer

C. MARSHALL DANN
Commissioner of Patents and Trademarks